(12) United States Patent
Chen et al.

(10) Patent No.: US 10,851,265 B2
(45) Date of Patent: Dec. 1, 2020

(54) POLYMERIC COMPOSITION WITH ANTI-ICING AND SELF-CLEANING PROPERTIES

(71) Applicants: SIEMENS GAMESA RENEWABLE ENERGY INNOVATION & TECHNOLOGY, S.L., Sarriguren (ES); NANYANG TECHNOLOGICAL UNIVERSITY, Singapore (SG)

(72) Inventors: Zhong Chen, Singapore (SG); Jose Luis González Moral, Sarriguren (ES); Weng Chye Jeffrey Ho, Singapore (SG); Pushkar Dilip Kanhere, Singapore (SG); Rosario Martinéz Ortigosa, Sarriguren (ES); Srikanth Narasimalu, Singapore (SG); Xinghua Wu, Singapore (SG)

(73) Assignees: NANYANG TECHNOLOGICAL UNIVERSITY, Singapore (SG); SIEMENS GAMESA RENEWABLE ENERGY INNOVATION & TECHNOLOGY, S.L.

( * ) Notice: Subject to any disclaimer, the term of this patent is extended or adjusted under 35 U.S.C. 154(b) by 15 days.

(21) Appl. No.: 16/342,241

(22) PCT Filed: Oct. 18, 2016

(86) PCT No.: PCT/ES2016/000114
§ 371 (c)(1),
(2) Date: Apr. 16, 2019

(87) PCT Pub. No.: WO2018/073460
PCT Pub. Date: Apr. 26, 2018

(65) Prior Publication Data
US 2019/0233675 A1    Aug. 1, 2019

(51) Int. Cl.
C09D 183/10    (2006.01)
C09D 5/00    (2006.01)
(Continued)

(52) U.S. Cl.
CPC ............. *C09D 183/10* (2013.01); *C09D 5/00* (2013.01); *C09D 7/20* (2018.01); *C09D 7/61* (2018.01);
(Continued)

(58) Field of Classification Search
None
See application file for complete search history.

(56) References Cited

U.S. PATENT DOCUMENTS

| 5,904,959 A | 5/1999 | Martin |
| 2013/0224496 A1* | 8/2013 | Palmateer ............ C09D 5/1675 428/413 |
| 2013/0234070 A1 | 9/2013 | Mowrer |

FOREIGN PATENT DOCUMENTS

| WO | 2012058657 A2 | 5/2012 |
| WO | WO 2012058657 A2 | 5/2012 |

(Continued)

OTHER PUBLICATIONS

PCT International Search Report corresponding to PCT International Application No. PCT/ES2016/000114.

*Primary Examiner* — Nathan T Leong
(74) *Attorney, Agent, or Firm* — Schmeiser, Olsen & Watts LLP (57) ABSTRACT

Polymeric compositions useful in preventing the frost or ice deposition in the surface of wind turbine generator blades present in a cold climates or high altitude are provided. In addition to the anti-icing capacity, the polymeric composition prevents the deposition of dirt, i.e. it has self-cleaning properties.

14 Claims, 8 Drawing Sheets

(51) Int. Cl.
*C09D 7/65* (2018.01)
*C09D 7/61* (2018.01)
*C09D 7/40* (2018.01)
*C09D 7/20* (2018.01)
*F03D 80/00* (2016.01)
*C09K 3/18* (2006.01)
*F03D 80/40* (2016.01)
*C08G 77/42* (2006.01)

(52) U.S. Cl.
CPC .............. *C09D 7/65* (2018.01); *C09D 7/67* (2018.01); *C09D 7/68* (2018.01); *C09K 3/18* (2013.01); *F03D 80/00* (2016.05); *C08G 77/42* (2013.01); *F03D 80/40* (2016.05); *F05B 2230/90* (2013.01); *Y02E 10/722* (2013.01)

(56) References Cited

FOREIGN PATENT DOCUMENTS

| WO | 2016090468 A1 | 6/2016 |
| WO | WO2016090468 * | 6/2016 |
| WO | WO 2016090468 A1 | 6/2016 |

\* cited by examiner

POLYMERIC COMPOSITION WITH ANTI-ICING AND SELF-CLEANING PROPERTIES

CROSS-REFERENCE TO RELATED APPLICATIONS

This application claims priority to PCT Application No. PCT/ES2016/000114, having a filing date of Oct. 18, 2016, the entire contents of which are hereby incorporated by reference.

FIELD OF TECHNOLOGY

The following belong to the field of anti-icing compositions, more particularly, it refers to a polymeric composition useful in preventing the frost or ice deposition or appearance in the surface of articles present in cold climates or high altitude. The composition of embodiments of the invention is especially suited for the coating of wind turbine generator blades. In addition to the anti-icing capacity the polymeric composition of embodiments of the present invention prevents the deposition of dirt, i.e. it has self-cleaning properties. The following is also related to a method for imparting anti-icing and self-cleaning properties to an article, as well as to an article coated with the polymeric composition of embodiments of the invention.

BACKGROUND

Wind turbines installed in cold climates, high altitudes, near to landfills etc. are exposed to dirt, frosting, ice formation and accretion problems that involve the modification profile of the blades with the consequent loss of energy production by decreasing performance appeared during the wind turbine generator (WTG) operation due to these undesirable atmospheric conditions. Even a small frosting/dirt layer can represent an important decrease of energy production.

This phenomenon affects the performance of a wind turbine in different ways. Ice and rain will cause severe effects on the aerodynamics and thus, on the loads and the power output of the turbine.

Especially high masses of ice on the structure can change the natural frequencies of wind turbine components and change the dynamic behavior of the whole turbine reducing the AEP and affecting negatively to the power curve.

Also, the control system can be affected. The stall of the rotor may occur earlier due to changed airfoil shape, the electrical or hydraulic pitch control can change their settings. Frozen or iced control instruments give faulty information to the control-supervisory system of the turbine. Moreover, if the power curve is too low, ice adhesion can even generate non-programmed stops, what affects strongly energy production.

Additionally, the structural integrity of the turbine itself can be affected by heavy unbalance due to unsymmetrical icing, by resonances caused by changed natural frequencies of components or exceeding the designed fatigue loads and producing non-programmed stops with the corresponding OPEX increase.

The safety of the wind turbine as well as the vicinity at the site will be also affected by icing or in general by cold climate operation. Ice fragments thrown away or even large ice pieces falling down from the rotor can harm persons or animals or damage objects.

During the WTG operation and according to atmospheric conditions, blade profiles could be modified with the consequent loss of energy production by decreasing performance. The loss of original airfoil on the blades is produced by the accumulation of undesirable substances on the blade, changing its performance, such as dust, ice accretion, etc.

Different solutions or strategies have been developed so far in wind industry in relation to ice:
Strategies to avoid ice accretion—"anti-icing" systems
Strategies to eliminate ice once formed—"de-icing" systems
In both cases the systems have been divided in:
Passive systems—these systems are depending on the physical properties of the blade surface
Active-systems—these systems require external systems and energy (thermal, chemical, etc) application
Up to date only active solutions have been validated with success in wind turbines since passive solutions do not fulfil wind blades requirements in relation to erosion resistance or life. Active solutions have the disadvantage however that they involve energy consumption and, moreover that it is not possible its repair in field. In case of any damage, it is necessary to disassemble the blade and carry out the repair in factory.

Therefore, industry is looking for passive solutions that do not involve energy consumption and maintain surface properties to protect blade against erosion, UV, etc.

Current self-cleaning solutions have the same problem. There are not commercial solutions in the market that fulfil all wind blades requirements in relation to erosion and ageing resistance.

Embodiments of the invention provides a solution to these drawbacks. The embodiments provide a passive anti-icing system based on a polymeric composition capable of preventing the formation of ice in the blades once it is applied on their surface. In addition, the polymeric composition of the invention also prevents the deposition of dirt and as such has self-cleaning properties. Moreover, the polymeric composition of the invention meets the standards of erosion, ageing and UV resistance required by the market.

Finally, although the composition of the invention has been specifically developed for preventing the deposition of ice and dirt in WTG, and more specially in WTG blades, it may be applied to the surface of any article that has to stand in cold climate under freezing conditions to prevent ice and dirt deposition.

BRIEF DESCRIPTION

Some of the embodiments will be described in detail, with reference to the following figures, wherein like designations denote like members, wherein.

DETAILED DESCRIPTION

The main object of embodiments of the invention is a polymeric composition with anti-icing and self-cleaning properties for the coating of surfaces comprising based on the total weight of the composition:

from 20 to 25 wt % of a hybrid polymeric matrix of siloxane and epoxy;

from 1.5 to 3.5 wt % a polydimethyl siloxane-based hydrophobic additive;

from 3 to 15 wt % of silica nanoparticles;

from 45 to 60 wt % of an organic solvent;

from 1 to 2% wt % of UV protecting additive;

from 10 to 13% of a curing agent or a mixture of curing agents.

In a more particular embodiment, the polymeric composition of embodiments of the invention comprises based on the total weight of the composition:

from 22 to 24 wt % of a hybrid polymeric matrix of siloxane and epoxy;

from 2 to 3 wt % a polydimethyl siloxane-based hydrophobic additive;

from 10 to 12 wt % of silica nanoparticles;

from 48 to 53 wt % of an organic solvent;

from 1 to 2% wt % of UV protecting additive;

from 11 to 12% of a curing agents.

From now on, the above-mentioned compositions can indistinctly be referred as the composition of embodiments of the invention.

The composition of embodiments of the invention is directly applicable to the surface of the article to which anti-icing and self-cleaning properties have to be imparted and the curing of the composition takes place room temperature conditions.

An essential element of the composition is the hybrid polymer of siloxane and epoxy. This forms the basic matrix of the polymeric composition and acts as support for the remaining elements imparting at the same time hardness to the coating once cured. The hardness and adhesion of the polymeric coating have been shown to be strongly correlated with the amount of hardener (curing agent) used.

It is therefore of main importance to use the curing agents within the exact amounts explained above, otherwise, the compositions will not have the appropriate mechanical properties for its intended use. In the context of embodiments of the invention, several hardeners or curing agents are suitable for carrying out the curing reaction. In a particular embodiment, the curing agent can be selected from amino substituted sylanes such as AMEO, AMMO, GLYMO, DAMO; cycloalifatic amines; aliphatic amines; amidoamines; polyamides; aminoethylaminopropyltrimethoxysilane; or combinations thereof.

The poly-dimethyl siloxane-based additive is the main element that imparts the anti-icing and self-cleaning properties to the composition. The hydrophobic properties of this element provide water repellency that avoids the deposition of water in the surface of coating once the composition is cured. Since water deposition is prevented in the surface of the coating, freezing does not occur, and the presence of ice is avoided. Similarly, the presence of polydimethyl siloxane-based additive avoids that dirt dissolved in water may be deposited in the surface of the polymeric coating, thus giving the self-cleaning capacity to the polymeric composition. The inventors have not only found that polydimethyl siloxane-based additive does provides very good water repellency with a water contact angle larger than 105° and an appropriate sliding of water properties but, in addition, they have found that the mechanical properties of hardness and adhesion of the polymeric coating are not affected.

Another element of the composition are the silica nanoparticles. This element acts as filler within the composition and also imparts hydrophobicity to the composition. It provides increased hardness and modulus and impart roughness to the surface of the coating. Moreover, due to its hydrophobic property it also contributes to improve the anti-icing and self-cleaning properties of the composition. The size of the silica nanoparticles used in embodiments of the present invention ranges from 10 to 300 nm. The nanoparticles may all have similar diameter or mixtures of silica nanoparticles with diameters within the range of 10 to 300 nm may be used. The presence of silica nanoparticles within the composition in the amounts explained above ensure an appropriate balance between maintaining the highest water contact angle without cracking and safeguarding good adhesion properties of the coating.

The composition also contains UV protecting additives that improves the weatherability of the composition by increasing the UV resistance. As a consequence of the presence of these elements, the change in color of the matrix due to UV radiation is avoided and in addition, it reduces the brittleness of the coating while maintaining adhesion. In embodiments of the invention, UV protecting additive is selected from alkyl or aminoether hindered amine light stabilizers, such as Tinuvin 292, Tinuvin 123, Tinuvin 152, SABO STAB UV65, ADK STAB LA-7; benzophenone-n; benzotriazoles; quenchers; carbon black light stabilizer dispersions; Graphene sheets; or nanoscale $TiO_2$ particles.

Finally, the last element of the composition is the solvent where that serves for dispersing the different elements of the composition. Any solvent that favors the polymer curing reaction is suitable in the context of embodiments of the invention. Ideally, the solvent must be suitable for making the polymeric composition sprayable. In this sense, in a particular embodiment the solvent is selected from t-butyl acetate, butyl acetate, THF, DMF, toluene, isopropilic alcohol, methanol, ethanol, 1-Propanol, n-Butanol, 1-Pentanol, 1-Hexanol, 1-Heptanol, 1-Octanol. The most preferred solvent to be used in the context of embodiments of the present invention is t-butyl acetate.

Another aspect of the invention is a method for imparting anti-icing and self-cleaning properties to an article that comprises coating the surface of such article with the polymeric composition of embodiments of the invention.

The coating of the surface of the article may be carried out by any commonly known method such as by immersion, spraying, spin or spinless coaters, foam press or roller application or painting brush application, magnetic levitation slip or related slip coating method. The preferred method of application of the polymeric composition of embodiments of the invention is by spraying.

Although the polymeric composition of embodiments of the invention has specifically been designed for wind turbine generator blade protection against ice and dirt and of course this is the preferred application, the method herein described allows imparting anti-icing and self-cleaning properties to the surface of any article which has to stand outdoors in cold climate or under any kind of freezing conditions. In particular, apart from wind turbine generator blade, the polymeric composition can be used according to the method herein described for imparting anti-icing and self-cleaning properties to nacelle surfaces, hub cover, sensors, motors, windows, metal tubes, ships, aircraft, winter sports facilities, roofs, solar panels, goggles, helmets, railway, lamps, exhibition panels, tents etc.

As a consequence, it is another aspect of embodiments of the invention an article coated with the polymeric composition of embodiments of the invention. Thus, according to this aspect, the article can be any of a wind turbine generator blade, nacelle surfaces, hub cover, sensors, motors, windows, metal tubes, ships, aircraft, winter sports facilities, roofs, solar panels, goggles, helmets, railway, lamps, exhibition panels, tents. In a preferred embodiment the article is a wind turbine generator blade.

The following examples are merely illustrative of certain embodiments of the invention and cannot be considered as restricting it in any way.

EXAMPLES

In the examples of this section several chemicals have been used. Here is a brief description of each of them:

SILIKOPON forms the matrix of the coatings. It is a hybrid of siloxane and epoxy. The presence of siloxanes makes it closer to the sol-gel formulation and allows use of various additives belonging to siloxane family. Silikopon is manufactured and supplied by Evonik.

AMEO is the hardener used for curing Silikopon. Ameo is supplied by Evonik.

Sylgard is a commercial elastomer manufactured by Dow Chemicals. Its main component is Polydimethoxysilane (PDMS). It comes in Part A and part B form, where part is B is the curing agent for the elatomer. PDMS is hydrophobic in nature and imparts non-wetting properties.

Tinuvin is an additive for improving the stability of the coatings against the UV exposure, supplied by CIBA.

Nanoparticles of $SiO_2$ with different particle sizes (Aerosil R972: 10-20 nm and Aerosil R812:200-300 nm) were added to the coating to impart hardness and right amount of surface roughness. Aerosil (R972, R812)—is a hydrophobic silica supplied by Evonik Industries. The functionalizing molecule is different for R972 and R812s.

Example 1

Preparation of the Formulations

The following two polymeric composition were developed:

Coating Formulation 1 (CF1)—This coating has PDMS as main additive for reducing the surface energy and contains 20 nm silica nanoparticles.

| Chemical | Weight (g) | Function | Weight Percent (%) |
|---|---|---|---|
| SILIKOPON Part A | 9.00 | Matrix | 23.08 |
| Sylgard 184 Part A | 1.00 | Hydrophobic additive | 2.56 |
| Nano $SiO_2$ (10-20 nm) | 4.00 | Filler-ceramic | 10.26 |
| t-Butyl acetate | 20.00 | solvent | 51.28 |
| Tinuvin 292 | 0.405 | UV protecting additive | 1.03 |
| Ameo | 4.50 | Curing agent for Silikopon | 11.54 |
| Sylgard 184 Part B (curing agent) | 0.10 | Curing agent for Sylgard | 0.26 |

Coating Formulation 2 (CF2)—This coating has PDMS as main additive for reducing the surface energy and contains 20 nm and 200 nm silica nanoparticles in combination.

| Chemical | Weight (g) | Function | Weight Percent (%) |
|---|---|---|---|
| SILIKOPON Part A | 9.00 | Matrix | 23.08 |
| Sylgard 184 Part A | 1.00 | Hydrophobic additive | 2.56 |
| Nano $SiO_2$ (10-20 nm) | 1.50* | Filler - ceramic | 3.85 |
| Nano Silica (200-300 nm) | 2.50* | Filler - Ceramic | 6.41 |
| t-Butyl acetate | 20.00 | solvent | 51.28 |
| Tinuvin 292 | 0.405 | UV protecting additive | 1.03 |
| Ameo | 4.50 | Curing agent for Silikopon | 11.54 |
| Sylgard 184 Part B (curing agent) | 0.10 | Curing agent for Sylgard | 0.26 |

*The ratios may vary

For the preparation of the coatings Silikopon part A and Sylgard 184 part A components are combined and thoroughly mixed, Tinuvin additive is also added to the mix.

Silica nanoparticles are added to the solvent and suspended using a high energy mixing system (sonication . . . ).

Both solutions are combined and the hardeners for Silikopon (AMEO) and Sylgard (Sylgard B) added to the mix.

Final solution is homogenized in a Tinky mixer for 10-40 minutes.

Example 2

Coating Properties 2.1 Physical Properties

Thickness is determined measuring the total thickness of the samples with a deep throat micrometer at several points.

Roughness is measured using a surface profiler and averaging the results from several measurements.

Water contact angle and rolling angles were determined using an OCAS 20 from Dataphysics.

Figure 1:
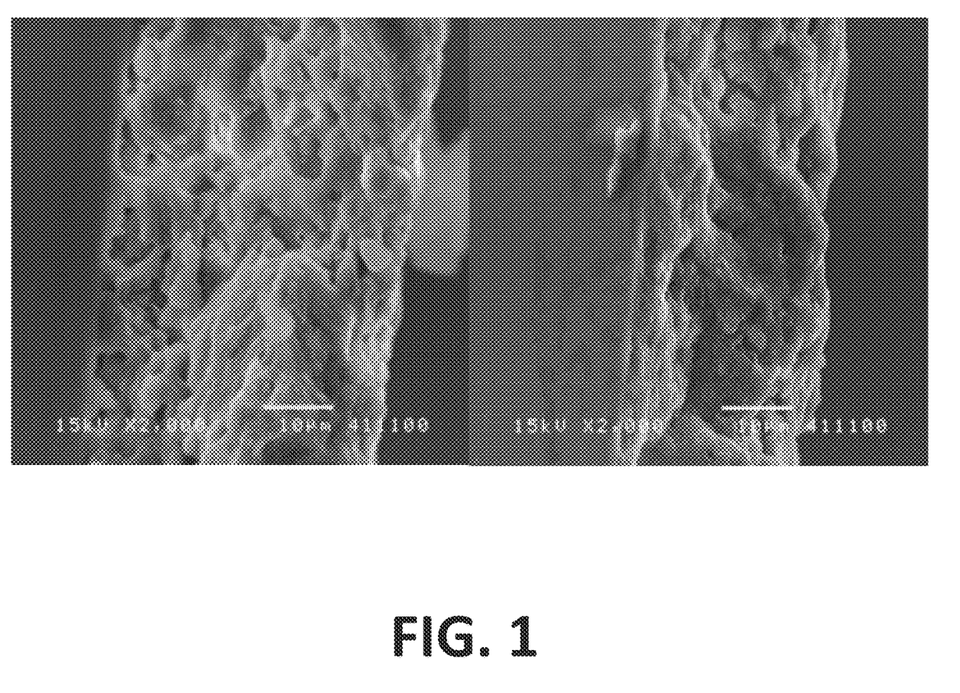
FIG. 1 shows electron micrographs of the coating resulting from the use of CF1 and CF2 (from left to right respectively)
Figure 2:
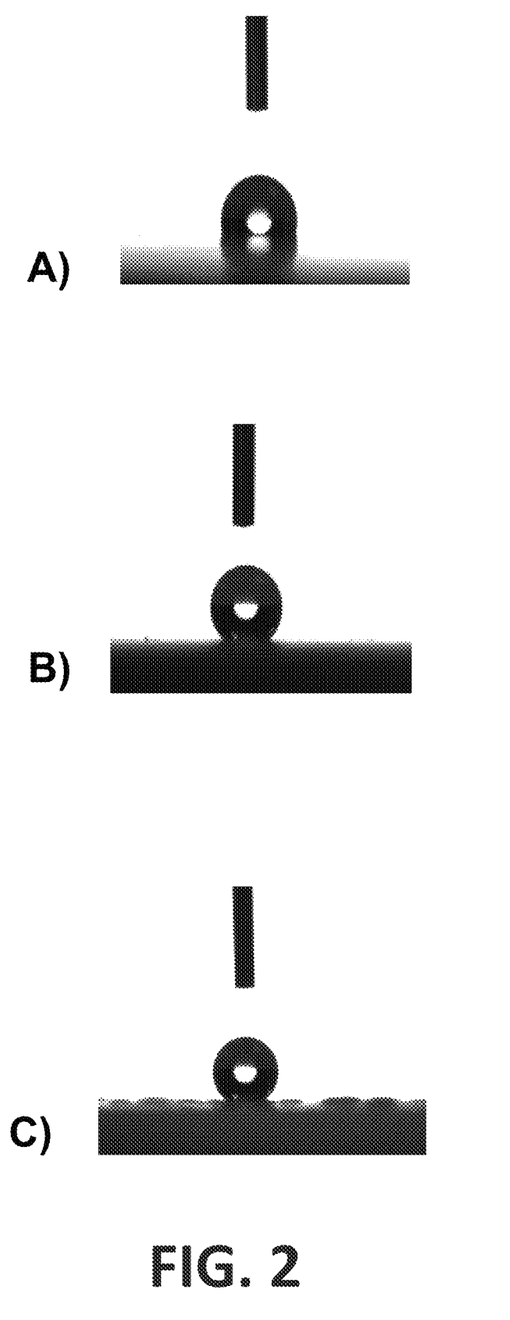
FIG. 2A shows a photograph of a water droplet in the surface of the three coating assayed the PU coating.
FIG. 2B shows a photograph of a water droplet in the surface of the three coating assayed the CF1 coating.
FIG. 2C shows a photograph of a water droplet in the surface of the three coating assayed the CF2 coating. It can be clearly observed that the water contact angle is much higher in compositions CF1 and CF2 than in the PU coating.

Physical tests such as average thickness, and average surface roughness, water contact angle, and rolling angle were carried out on the coatings. The electron micrographs (FIG. 1) show uniform microstructures and presence of porosity in both the compositions CF1 and CF2. The physical properties of the coatings are presented in Table 1 where several physical properties of CF1 and CF2 are compared to a reference coating of Polyurethane commonly used as coating for WTG blades. Both CF1 and CF2 coatings show superhydrophobic behavior and shade off water droplet at lower angles (see also FIG. 2).

TABLE 1

Physical properties of the coatings

| Test | PU coating | CF1 | CF2 | Unit |
|---|---|---|---|---|
| Average thickness | 95-100 | 25-40 | 20-50 | µm |
| Average roughness | 0.12 | 0.56 | 0.47 | µm |
| Avg. water contact angle | 98 ± 1.3 | 155 ± 1.24 | 158 ± 3.78 | ° |
| Water rolling angles | unable to roll off | 15 | 30 | ° |

Additional information on physical properties

The thickness is according to SEM cross section figure, controlled thickness can be obtained from 20-50 micrometer.

Roughness was measured by surface profiler. The solution used for spraying the coating contains around 50-60% solid content by volume.

2.2 Mechanical Properties 2.2.1 Cross-Cut Test

Figure 3:
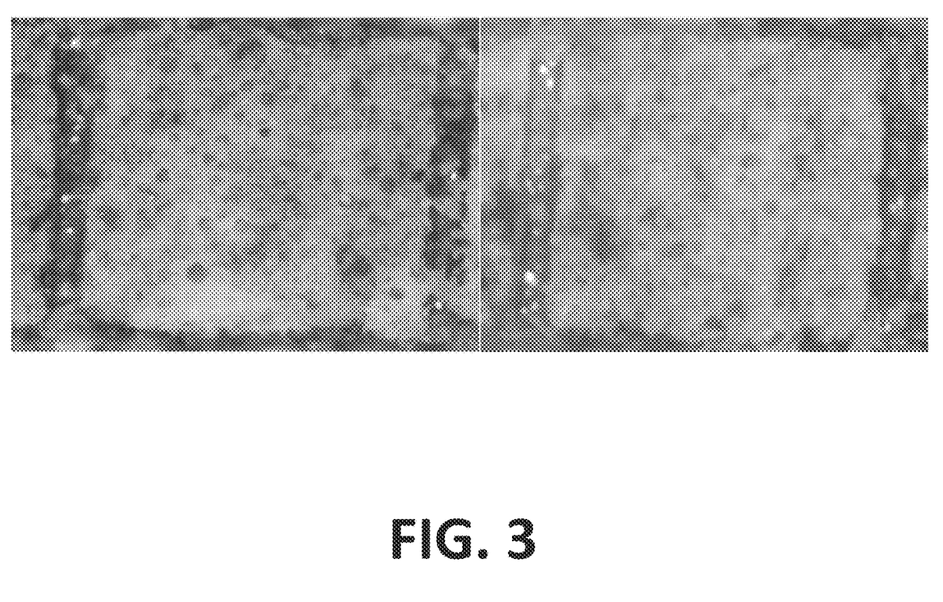
FIG. 3 shows an Optical Micrograph of Cross-cut Test of CF1 and CF2 (from left to right respectively)

Both the superhydrophobic coatings CF1 and CF2 demonstrated good adhesion toward the epoxy substrate and classification of 5 has been achieved. The optical images (FIG. 3) show that the failure of the coatings (edges of the square) is not a brittle failure, indicating good substrate adhesion and non-brittle nature of the coating.

Cross-cut test is conducted according to ISO 2409 standard.

2.2.2 Nanoindentation (Hardness and Modulus)

Nanoindentation test was done to study the indentation hardness and Young's modulus of the coatings. The indentation is at a fractional depth of the coating and thus the influence from substrate is avoided. The results of the hardness test showed that both the coatings CF1 and CF2 have hardness values an order of magnitude higher than that of PU reference coatings.

Table 2 summarizes the results of the different mechanical test on CF1 and CF2 coating and on PU coatings as a reference coating.

2.3 Functional Tests 2.3.1 Self-Cleaning: Dirt Accumulation Test

Dirt accumulation test: The sample is dip 3-5 times in dirt slurry. After drying the change in brightness is measured.

Figure 4:
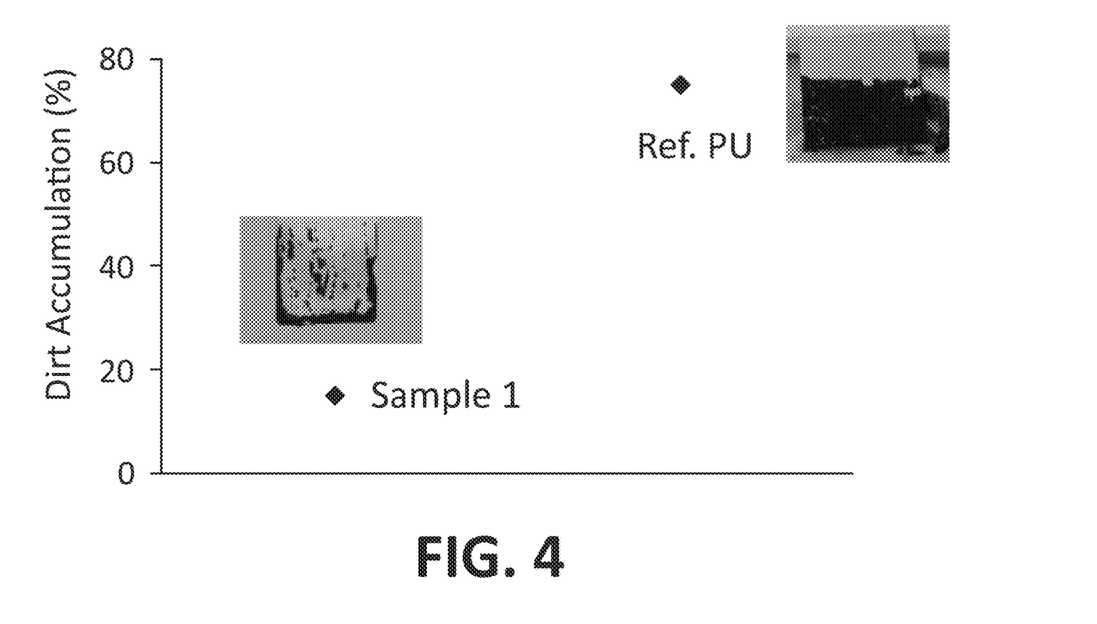
FIG. 4 shows a Dirt accumulation test of CF1 sample.
Figure 5:
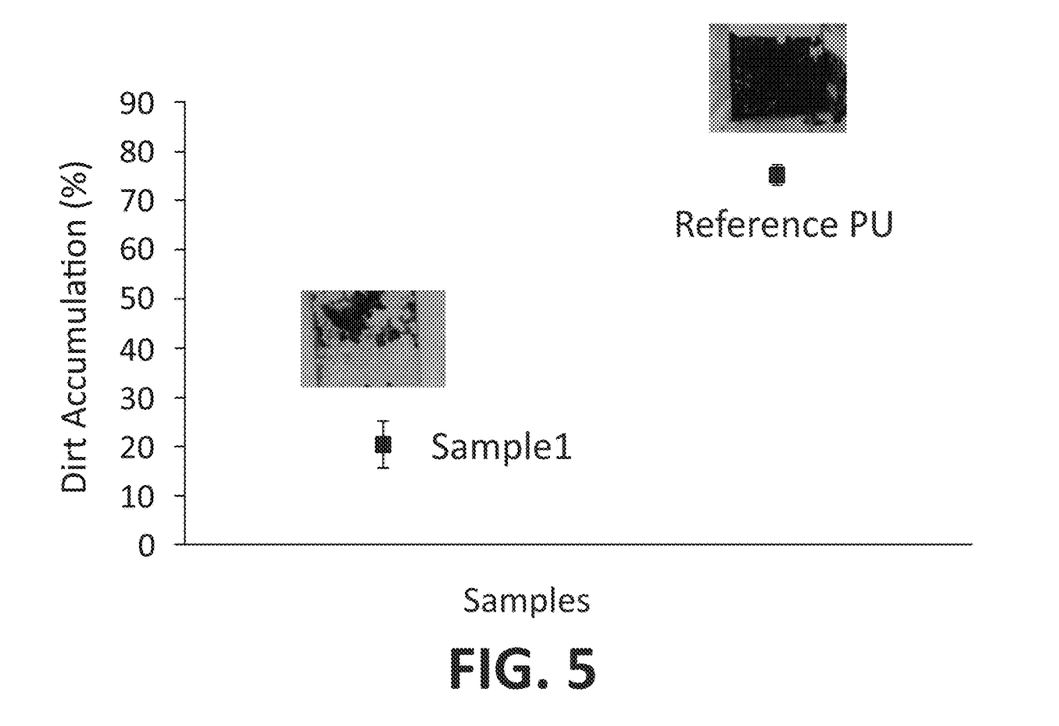
FIG. 5 shows a Dirt accumulation test of CF2 sample.

For the accumulation tests carried out here, a gel like mixture was made and the samples was dipped into the mixture. The dirt sticking to the sample was measured in terms of blackness (luminescence value). FIG. 4 shows the dirt accumulation (%) on CF1 and PU samples. The test clearly shows that CF1 shows less dirt accumulation, as the surface is non-sticking. The percentage accumulation on CF1 sample was found to be 15% while that on the CF2 was around 20%. FIG. 4 shows dirt accumulation test on CF2 samples. As compared to CF1 and CF2 samples, reference PU sample accumulation was around 75%.

2.3.2 Anti-Icing Test: Ice Accumulation Test

Ice accumulation on the surface at an angle is investigated in an icing chamber. The amount of ice accumulated on the surface, when water droplets at 0° C. were dropped on it was recorded by measuring the weight accumulated. Test is conducted in an icing chamber, typically the test is done at −15° with water at 0°. Substrate is tilted 45° and 2 g of water in the form of droplets are let fall on the surface. The weight increase after test is measured.

Figure 6:
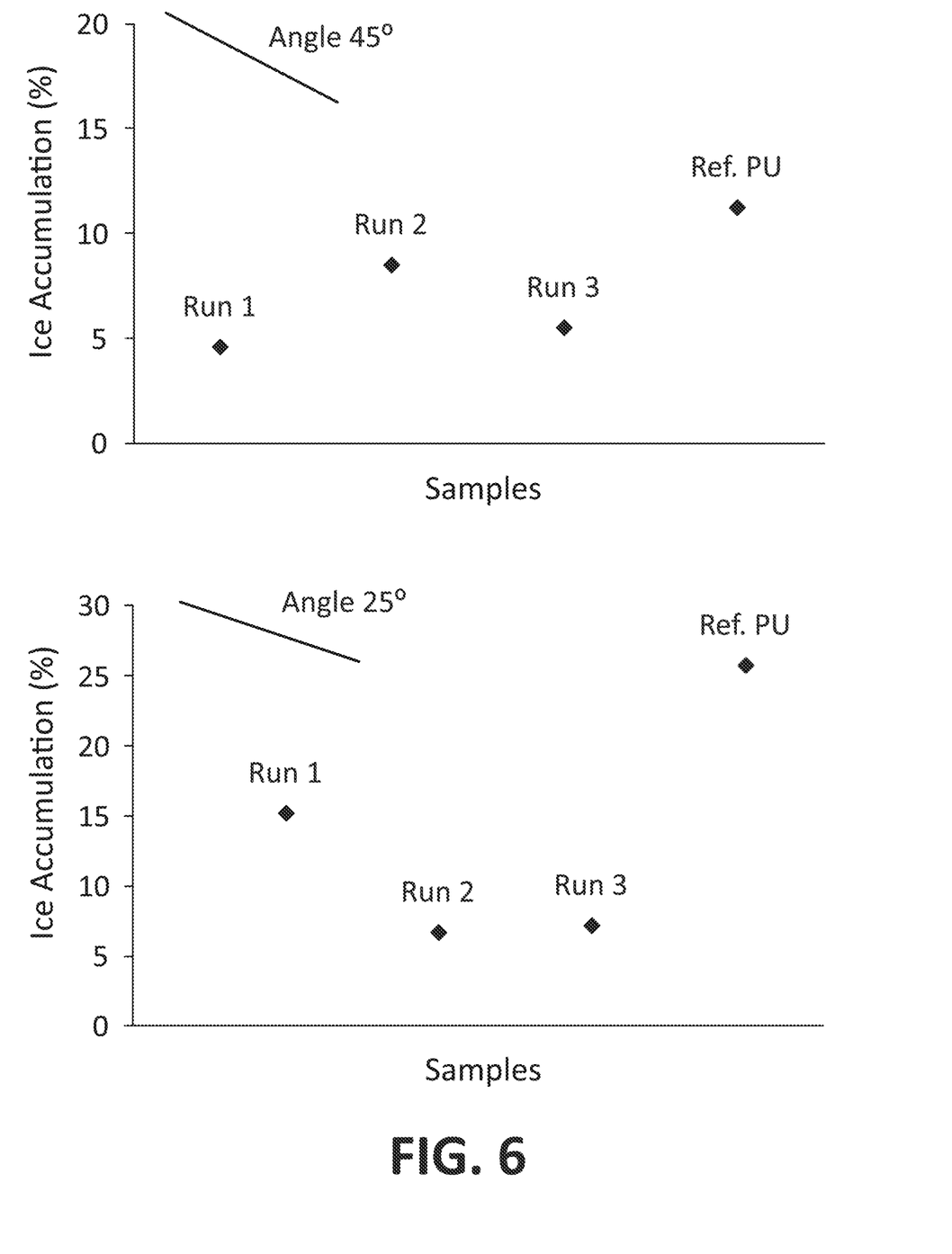
FIG. 6 shows a graph displaying the percentage of ice accumulation for sample CF1 at angles 45° and 25°.

CF1 coating showed less ice accumulation (8-10%) on account of their hydrophobic nature. FIG. 6 shows the accumulation for three runs, at different angles.

Figure 7:
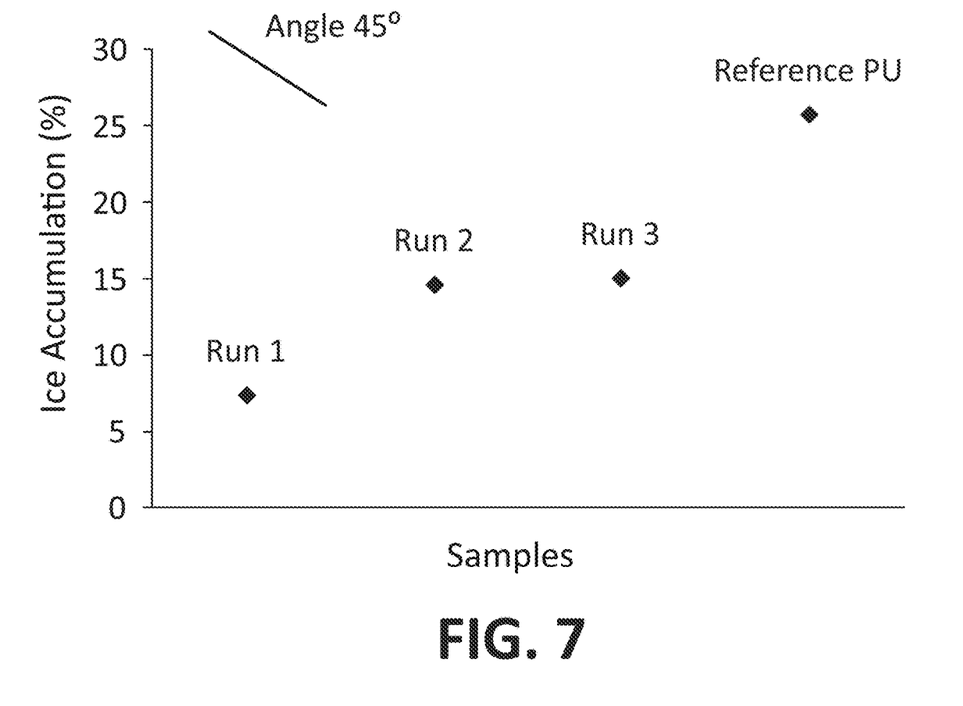
FIG. 7 shows a graph displaying the percentage of ice accumulation for sample CF2 at angles 45°.

Similarly, CF2 samples showed accumulation of ice around 12-14% under the similar conditions (FIG. 7).

As compared to PU coatings, the amount of ice accumulated on CF1 was 50-70% less under same conditions. It is noted that the ice accretion depends on the slant angle.

2.4 Durability Test: Weathering and Abrasion

The durability tests (abrasion and UV weathering) were carried out only on CF1 formulation. The samples are exposed to weathering (UV and water spray—ISO 11341) and abrasion (sand paper/polishing wheel) and their mechanical and functional properties are studied before and after these tests.

2.4.1 Weathering Test

The weathering test was performed according to ISO 11341 standard. The samples were exposed to UV light and water using a weathering chamber. The samples were tested for contact angle, rolling angle, indentation hardness, tape adhesion, dolly pull-off and functionality tests after the exposure to UV. All results show that the effect of UV on the properties of the samples is insignificant and the formulation is stable under UV. The results are summarized in Table 3.

TABLE 2

Summary properties of the coatings

| | Results | | | |
|---|---|---|---|---|
| Test | Game PU coating | Superhydrophobic Coating CF1 | Superhydrophobic Coating CF2 | Unit |
| Cross-cut Scratch Test (ISO 2409) | 4 | 5 | 5 | B |
| Pencil Scratch Test (ISO 15184) | 8 | 9 | 9 | H |
| Nano-indentation Modulus** | 0.122 ± 0.01 | 1.28 ± 0.52 | 2.39 ± 0.96 | GPa |
| Nano-indentation Hardness** | 0.023 ± 0.003 | 0.037 ± 0.023 | 0.070 ± 0.030 | GPa |

**Modulus and hardness were continuously measured from top surface (depth 0 nm) to 2000 nm into the material. 10~12 indents were made on each sample. Considering the effect of surface roughness, averaged results were obtained in the depth range of 1500~2000 nm.

TABLE 3

Summary of results of properties of coatings before and after UV weathering

| Property | PU-before UV | PU-after UV | CF1-before UV | CF1-after UV |
|---|---|---|---|---|
| Contact Angle | 98 ± 1.3° | 98 ± 0.98° | 155 ± 1.24° | 155 ± 3.69° |
| Rolling Angle | N | N | 15 | 30 |
| Surface roughness (μm) | 0.12 | 0.15 | 0.56 | 0.58 |
| Tape adhesion | 4B | 4B | 5B | 5B |
| Nano-indentation Modulus | 0.122 ± 0.01 GPa | 0.109 ± 0.01 GPa | 1.28 ± 0.52 GPa | 1.72 ± 0.73 GPa |
| Nano-indentation Hardness | 0.023 ± 0.003 GPa | 0.021 ± 0.003 GPa | 0.037 ± 0.023 GPa | 0.076 ± 0.044 GPa |

Figure 8:
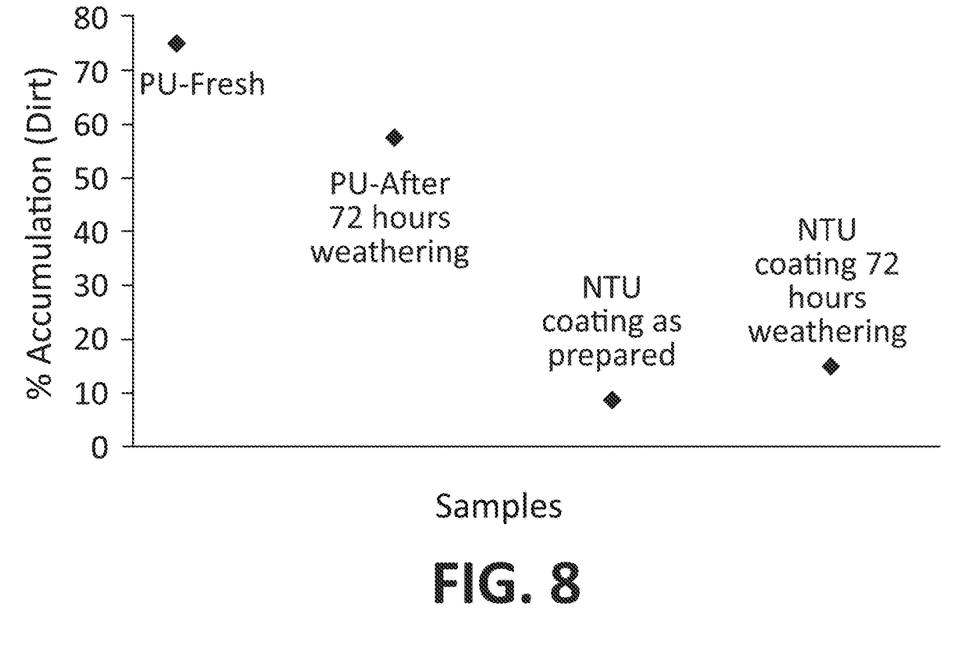
FIG. 8 shows a graph displaying the effect of UV weathering on the dirt accumulation test.
Figure 9:
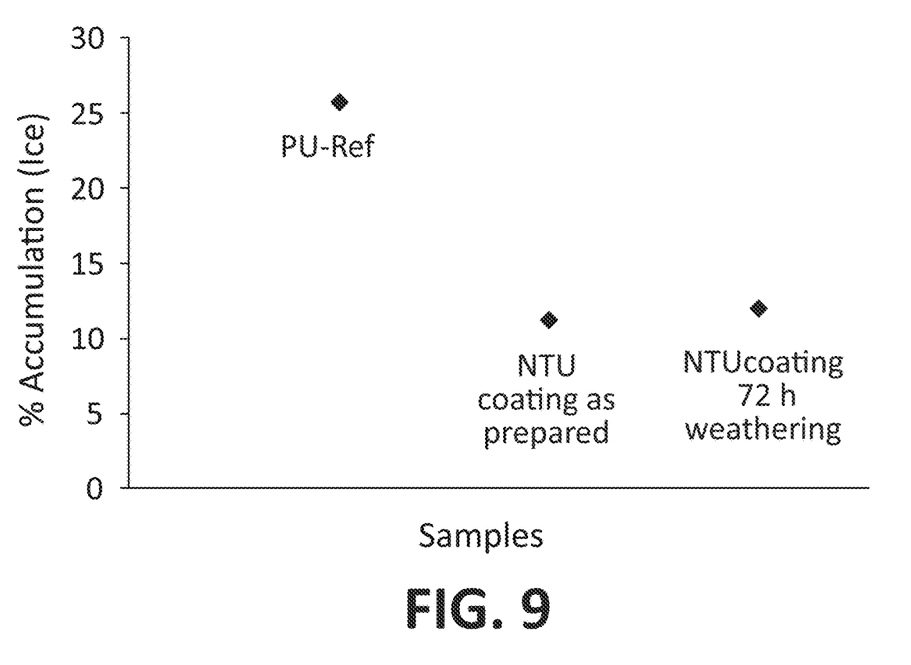
FIG. 9 shows a graph displaying the effect of UV weathering on the ice accumulation test.

The effect of UV on the functional tests was also studied. FIG. 8 and FIG. 9 show the dirt accumulation and ice accumulation on the coatings exposed to UV. The effect was found to be negligible.

Further, the effect of UV on the hardness and modulus values was also insignificant.

The above results indicate that the composition is stable under UV radiation.

2.4.2 Abrasion Test (Wear Test)

The test was carried out using #320, 800 and 1000 SiC sandpapers. Freshly prepared coating was abraded using the sandpaper. The polishing sandpapers were mounted on a wheel rotating at 200-250 RPM. The samples were held by hand and gently place on top of the rotating sandpaper. The polishing was carried out for 30-50 seconds. After abrasion the samples were washed with ethanol, sonicated in DI water. The samples were completely dried using a hand dryer and the measurements of contact angle (CA) were performed. At least 5 readings of CA values were recorded at different locations of the sample. Surface roughness and weight loss after abrasion was also recorded by surface profiler and weighing machine separately. Table 4 and 5 present a summary of results of the coatings before and after abrasion for PU reference coating and for CF1.

TABLE 4

Summary of results of properties of coatings before and after abrasion test- PU reference coating

| | PU | | | | |
|---|---|---|---|---|---|
| | Original | #320 | #800 | #1000 | Unit |
| Water contact angle | 98 ± 1.3 | 103 ± 2.1 | 90 ± 1.25 | 80 ± 1.1 | ° |
| Water sliding angle (20 μl) | N | N | N | N | ° |
| Roughness | 0.123 ± 0.0004 | 0.29 ± 0.001 | 0.16 ± 0.0009 | 0.11 ± 0.0006 | μm |
| Weight loss | — | 0.039 | 0.039 | 0.042 | g |

TABLE 5

Summary of results of properties of coatings before and after abrasion test - CFI

| | CFI | | | | |
|---|---|---|---|---|---|
| | Original | #320 | #800 | #1000 | Unit |
| Water contact angle | 155 ± 1.24 | 152 ± 2.17 | 142 ± 1.85 | 140 ± 2.0 | ° |
| Water sliding angle (20 ul) | 5 | 40 | N | N | ° |
| Roughness | 0.555 ± 0.093 | 0.639 ± 0.022 | 0.444 ± 0.028 | 0.1996 ± 0.014 | μm |
| Weight loss | — | 0.027 | 0.021 | 0.023 | g |

Figure 10:
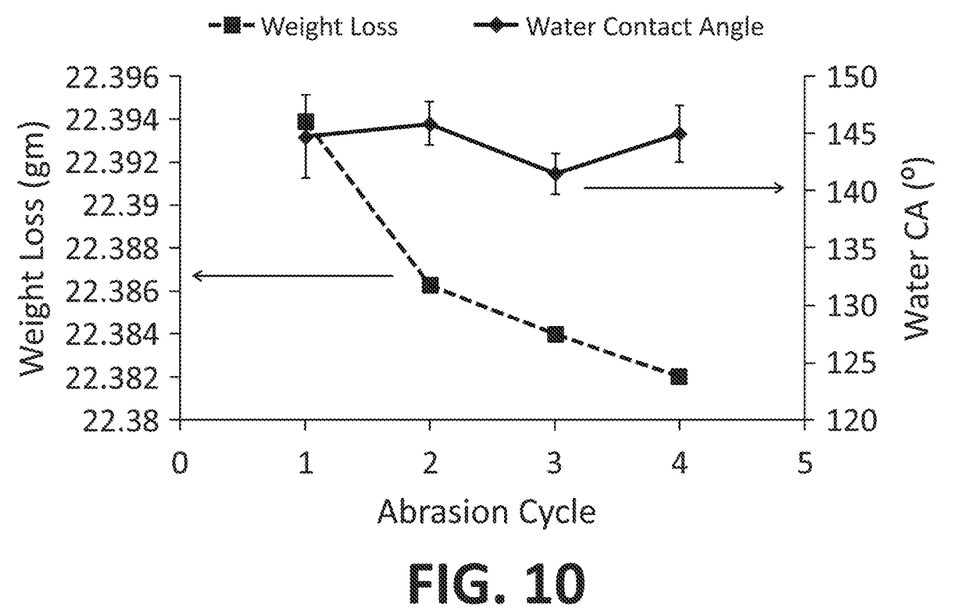
FIG. 10 shows a graph displaying the effect of abrasion on the contact angle and subsequent weight loss (independent test: no pressure applied on the samples; not hand held)

In addition to this method, abrasion of the samples was carried out without holding the samples by hand (FIG. 10). The samples were only supported from the side. The effect of abrasion on contact angle and subsequent weight loss was studied to confirm the results from the earlier test. The weight loss indicates that coating material is worn out (removed), while the corresponding contact angle values do not change significantly. This test shows that the hydrophobic additives in the coatings are uniformly dispersed throughout its thickness.

Figure 11:
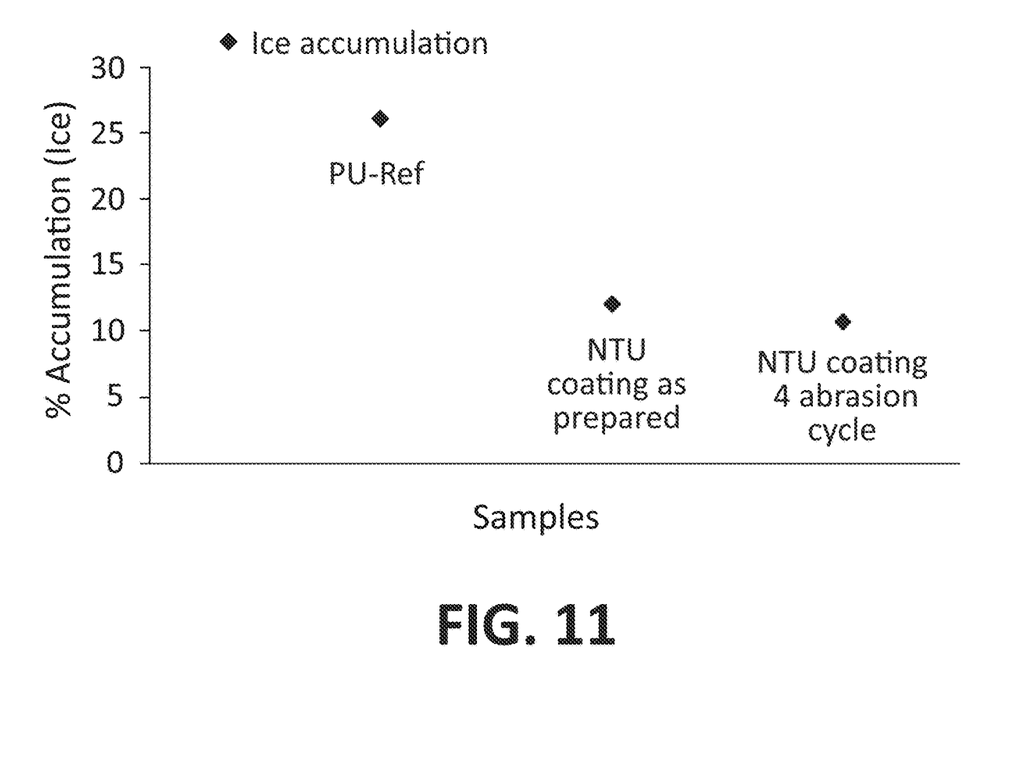
FIG. 11 shows a graph displaying the effect of abrasion on the ice accumulation test.

FIG. 6 showed the ice accumulation test carried out on the CF1 samples. Now, FIG. 11 shows ice accumulation after 4 abrasion cycles. As observed after the abrasion, ice accumulation in CF1 remains mainly as low as without abrasion and in any case ice accumulation is significantly less than that of the PU coating.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A polymeric composition with anti-icing and self-cleaning properties for the coating of surfaces comprising based on the total weight of the composition:
   from 20 to 25 wt % of a hybrid polymeric matrix of siloxane and epoxy;
   from 1.5 to 3.5 wt % a polydimethyl siloxane-based hydrophobic additive;
   from 3 to 15 wt % of silica nanoparticles;
   from 45 to 60 wt % of an organic solvent;
   from 1 to 2% wt % of UV protecting additive;
   from 10 to 13% of a curing agent or a mixture of curing agents.

2. The polymeric composition according to claim 1, comprising based on the total weight of the composition:
   from 22 to 24 wt % of a hybrid polymeric matrix of siloxane and epoxy;
   from 2 to 3 wt % a polydimethyl siloxane-based hydrophobic additive;
   from 10 to 12 wt % of silica nanoparticles;
   from 48 to 53 wt % of an organic solvent;
   from 1 to 2% wt % of UV protecting additive;
   from 11 to 12% of a curing agents.

3. The polymeric composition according to claim 1, where silica nanoparticles have a particle size from 10 to 300 nm.

4. The polymeric composition according to claim 1, where the organic solvent is selected from t-butyl acetate, butyl acetate, THF, DMF, toluene, isopropilic alcohol, methanol, ethanol, 1-Propanol, n-Butanol, 1-Pentanol, 1-Hexanol, 1-Heptanol, 1-Octanol.

5. The polymeric composition according to claim 4, where the organic solvent is t-butyl acetate.

6. The polymeric composition according to claim 1, where the UV protecting additive is selected from alkyl or aminoether hindered amine light stabilizers, such as Tinuvin 292, Tinuvin 123, Tinuvin 152, SABO STAB UV65, ADK STAB LA-7; benzophenone-n; benzotriazoles; carbon black light stabilizer dispersions; Graphene sheets; nanoscale $TiO_2$ particles.

7. The polymeric composition according to claim 1, where the curing agent is selected from amino substituted silanes such as AMEO, AMMO, GLYMO, DAMO; cycloalifatic amines; aliphatic amines; amidoamines; polyamides; aminoethylaminopropyltrimethoxysilane; or combinations thereof.

8. A method for imparting anti-icing properties to an article that comprises coating the surface of such article with the polymeric composition according to claim 1.

9. The method according to claim 8, where the coating of the surface of the article with the polymeric composition is performed by immersion, spraying, spin or spinless coators, foam press or roller application or painting brush application, magnetic levitation slip or related slip coating method.

10. The method according to claim 9, where the article is selected from wind turbine generator blade, nacelle surfaces, hub cover, sensors, motors, windows, metal tubes, ships, aircraft, winter sports facilities, roofs, solar panels, goggles, helmets, railway, lamps, exhibition panels, tents.

11. The method according to claim 10, where the article is a wind turbine generator blade.

12. An article coated with the polymeric composition according to claim 1.

13. The article according to claim 12, selected from wind turbine generator blade, nacelle surfaces, hub cover, sensors, motors, windows, metal tubes, ships, aircraft, winter sports facilities, roofs, solar panels, goggles, helmets, railway, lamps, exhibition panels, tents.

14. The article according to claim 13, where the article is a wind turbine generator blade.

* * * * *